(12) United States Patent
Wilhelm et al.

(10) Patent No.: US 10,994,595 B2
(45) Date of Patent: May 4, 2021

(54) ENGINE MOUNT PENDULUM SUPPORT DEVICE

(71) Applicant: VIBRACOUSTIC GMBH, Darmstadt (DE)

(72) Inventors: Petra Wilhelm, Edingen (DE); Arnold Simuttis, Bad Kreuznach (DE)

(73) Assignee: VIBRACOUSTIC GMBH, Darmstadt (DE)

( * ) Notice: Subject to any disclaimer, the term of this patent is extended or adjusted under 35 U.S.C. 154(b) by 406 days.

(21) Appl. No.: 16/062,774

(22) PCT Filed: Nov. 14, 2016

(86) PCT No.: PCT/EP2016/077581
§ 371 (c)(1),
(2) Date: Jun. 15, 2018

(87) PCT Pub. No.: WO2017/102197
PCT Pub. Date: Jun. 22, 2017

(65) Prior Publication Data
US 2020/0262287 A1 Aug. 20, 2020

(30) Foreign Application Priority Data
Dec. 18, 2015 (DE) ...................... 10 2015 122 226.4

(51) Int. Cl.
*B60K 5/12* (2006.01)
(52) U.S. Cl.
CPC .......... *B60K 5/1241* (2013.01); *B60K 5/1208* (2013.01)
(58) Field of Classification Search
CPC .............................. B60K 5/1208; B60K 5/1225
See application file for complete search history.

(56) References Cited

U.S. PATENT DOCUMENTS

| 7,182,306 B2 * | 2/2007 | Tsutsumida | B60K 5/1291 248/609 |
| 7,350,777 B2 * | 4/2008 | Ogawa | F16F 1/54 267/140.4 |

(Continued)

FOREIGN PATENT DOCUMENTS

| DE | 19545593 C1 | 1/1997 |
| FR | 2831111 A1 | 4/2003 |

(Continued)

OTHER PUBLICATIONS

International Search Report PCT/EP2016/077581, dated Feb. 20, 2017.

*Primary Examiner* — Jeffrey J Restifo
(74) *Attorney, Agent, or Firm* — Fishman Stewart PLLC (57) ABSTRACT

The invention relates to an engine mount pendulum support device for supporting an engine relative to the body of a motor vehicle. The engine mount pendulum support device comprises a first attachment region for attaching the engine mount pendulum support device to the body, which attachment region comprises a first attachment surface for contact with the body, a second attachment region for attaching the engine mount pendulum support device to the body, which attachment region comprises a second attachment surface for contact with the body, a third attachment region for attaching the engine to the engine mount pendulum support device, wherein the first attachment region and the second attachment region are elastically connected to the third attachment region via a first elastic mount and via a second elastic mount, wherein the first attachment region and the second attachment region are firmly connected to each other by a connection member.

15 Claims, 8 Drawing Sheets

(56) References Cited

U.S. PATENT DOCUMENTS

| | | | |
|---|---|---|---|
| 8,348,007 B2* | 1/2013 | Hermann | F16F 1/3828 180/382 |
| 8,376,330 B2* | 2/2013 | Weissbecker | F16F 1/373 267/140.5 |
| 8,403,097 B2* | 3/2013 | Joly | F16F 13/10 180/291 |
| 9,360,079 B2* | 6/2016 | Ichikawa | F16F 13/262 |
| 9,394,958 B2* | 7/2016 | Setoyama | F16F 1/3828 |
| 9,409,472 B2* | 8/2016 | Hatanaka | B60K 5/1208 |
| 9,586,467 B2* | 3/2017 | Kim | B60K 5/12 |
| 9,610,979 B2* | 4/2017 | Hirano | B60K 5/1216 |
| 9,623,909 B1* | 4/2017 | Hirano | B60K 5/1216 |
| 9,689,457 B2* | 6/2017 | Kojima | F16F 1/3849 |
| 9,731,586 B2* | 8/2017 | Sakamoto | F16M 13/02 |
| 9,771,996 B2* | 9/2017 | Ishikawa | B60K 5/1291 |
| 10,215,091 B2* | 2/2019 | Kondo | F02B 75/04 |
| 10,228,041 B2* | 3/2019 | Ikawa | F16F 13/106 |
| 10,279,670 B2* | 5/2019 | Nakamaru | F16F 1/36 |
| 10,279,671 B2* | 5/2019 | Soma | B60K 5/12 |
| 10,316,928 B2* | 6/2019 | Yanagida | B60K 5/1283 |
| 10,414,261 B2* | 9/2019 | Ikawa | F16F 1/36 |
| 10,518,623 B2* | 12/2019 | Takahashi | B60K 5/1208 |
| 10,611,227 B2* | 4/2020 | Kim | B60K 5/1233 |
| 10,654,352 B2* | 5/2020 | Kim | B60K 5/1208 |
| 10,661,648 B2* | 5/2020 | Nozaki | B60K 5/1291 |
| 10,759,263 B2* | 9/2020 | Kato | F16F 1/38 |
| 10,773,584 B2* | 9/2020 | Kim | F16F 13/18 |

FOREIGN PATENT DOCUMENTS

| | | |
|---|---|---|
| JP | 200559806 A | 3/2005 |
| JP | 2005075157 A | 3/2005 |
| JP | 2005075223 A | 3/2005 |
| JP | 2008128266 A | 6/2008 |
| JP | 2013108555 A | 6/2013 |

* cited by examiner

ENGINE MOUNT PENDULUM SUPPORT DEVICE

CROSS-REFERENCE TO RELATED APPLICATION

This application is a National Stage Patent Application of International Patent Application No. PCT/EP2016/077581, filed Nov. 14, 2016, which claims the benefit of German Application Serial No. 10 2015 122 226.4, filed Dec. 18, 2015, the contents of each are incorporated by reference in their entireties.

TECHNICAL FIELD

The invention relates to an engine mount pendulum support device for supporting an engine relative to the body of a vehicle. The engine mount pendulum support device has a first attachment region, a second attachment region and a third attachment region. The first and second attachment regions each serve for attaching the engine mount pendulum support device to the body. The third attachment region is provided for attaching the engine to the engine mount pendulum support device.

BACKGROUND

Engine mounts serve for supporting an engine relative to the body of the vehicle. For this purpose, the engine mounts are equipped with elastic mounts, which are capable of elastically absorbing the vibrations of the engine and thus insulate against them. Most frequently, the elastic mounts are configured in such a way that they are capable of effectively absorbing the vibrations of the engine only in one direction; this is often in the direction of the force of gravity of the engine. Movements of the engine perpendicular to this direction of vibration of absorption, be they vibrations or induced by the inertia of the engine, can be absorbed by the elastic mount only with difficulty. Therefore, some engine mounts are provided with a pendulum support that absorbs the occurring torques during the driving operation. In this case, the pendulum support constitutes another connection between the engine and the body.

JP 2005 075 223 A and JP 2005 075 157 A show engine mounts with pendulum supports in which the pendulum support is attached to the body without being spaced apart from the attachment of the elastic mount, but is configured in such a way that it is attached to the same location on the body as the elastic mount.

SUMMARY

It is the object of the invention to provide an engine mount pendulum support device that makes it possible to reliably support the engine while enabling a simple installation at the same time.

The object is achieved by an engine mount pendulum support device as disclosed herein.

This disclosure describes preferred embodiments of the engine mount pendulum support device according to the invention.

The invention relates to an engine mount pendulum support device for supporting an engine relative to the body of a motor vehicle. The engine mount pendulum support device comprises a first attachment region, a second attachment region, a third attachment region, a first elastic mount and a second elastic mount. The first attachment region serves for attaching the engine mount pendulum support device to the body and comprises a first attachment surface for contact with the body. The second attachment region serves for attaching the engine mount pendulum support device to the body and comprises a second attachment surface for contact with the body. The third attachment region serves for attaching the engine to the engine mount pendulum support device. The second attachment surface is offset from a plane defined by the first attachment surface. The first attachment region and the second attachment region are elastically connected to the third attachment region via a first elastic mount, which is configured for absorbing vibrations in a first direction, and via a second elastic mount, which is configured for absorbing vibrations in a second direction perpendicular to the first direction. The first attachment region and the second attachment region are firmly connected to each other by a connection member.

The engine mount pendulum support device supports the engine, in particular elastically, relative to the body of the motor vehicle. The engine mount pendulum support device according to the invention causes the body to be insulated from vibrations of the engine. Furthermore, the forces arising during the driving operation can be absorbed. The weight force of the engine preferably corresponds to the first direction.

The engine mount pendulum support device is attached to the body of the vehicle by means of the first attachment region. Preferably, the first attachment region is provided for attaching the engine mount pendulum support device to a side member of the body. The first attachment region may be realized, for instance, by a flange. Further, it is also possible for the first attachment region to be realized by two or more spaced-apart flanges. Attachment to the body may be effected by means of screws or bolts. The first attachment region may be configured in one or several pieces.

The surface with which the first attachment region is in contact with the body is referred to as the first attachment surface. The first attachment surface is preferably the surface along which force is transmitted from the first attachment region to the body. The first attachment surface is disposed, in particular, perpendicularly to the first direction.

Components provided for attaching the first attachment region between the first attachment region and the body are considered, within the context of this invention, to belong to the first attachment region. Thus, the first attachment surface is, in particular, always directly disposed on the body and is defined by it. At the first attachment surface, the first attachment region is preferably shaped like the body at the location of the attachment.

In particular, the first attachment surface is configured as a planar plane, for example, when the body has a straight plane in the region of the attachment of the engine mount pendulum support device. However, it is also possible for the first attachment surface to be configured in a curved manner. Furthermore, the first attachment surface may be composed of several partial surfaces, for example if the first attachment region has several attachment locations spaced apart from one another.

The considerations regarding the first attachment region apply analogously to the second attachment region. In particular, the second attachment region is not disposed at the same location of the body as the first attachment region, for instance not on the side member, like the first attachment region. The second attachment region may be attached to a wheelhouse of the vehicle. The second attachment surface is disposed, in particular, perpendicularly to the second direction.

However, the second attachment region is spaced apart from the first attachment region. In this case, the second attachment surface is offset from a plane defined by the first attachment surface. In particular, the second attachment surface is offset from the first attachment surface in the first direction and/or in the second direction and/or in a third direction perpendicular to the first direction and the second direction.

In this case, the attachment of the second attachment region to the body is such that it serves for supporting the engine mount pendulum support device in a lateral direction, i.e. for stabilizing the attachment of the engine mount pendulum support device to the first attachment surface. In particular, support against forces which act on the engine mount pendulum support device and act parallel to the plane of the first attachment surface is to be provided by means of the second attachment region. For the first attachment region absorbs those forces, in particular, that act perpendicularly to the first attachment surface. Therefore, the second attachment region serves for laterally supporting the first attachment region.

It should be noted that the first elastic mount is also able to absorb forces in the second direction, but is configured, in particular, to absorb forces along the first direction. Similarly, the second elastic mount is configured to absorb forces along the second direction particularly well, but is also able to absorb forces along the first direction.

In particular, the third attachment region is configured in such a way that the engine of the vehicle can be attached thereto. For example, the third attachment region may also be configured as it is known from the prior art for engine mounts.

The first attachment region and the third attachment region are elastically connected to each other via the first elastic mount. The combination consisting of the first attachment region, the third attachment region and the first elastic mount may be configured, for example, like an engine mount known from the prior art. In particular, the assembly of the first attachment region, the third attachment region and the first elastic mount serves for supporting the engine on the body, so that the first elastic mount supports the weight of the engine, as well as vibrations generated by the engine. In particular, the first elastic mount is configured for insulating against vibrations of the engine.

The second attachment region is connected to the third attachment region via a second elastic mount. The assembly of the second attachment region, the third attachment region and the second elastic mount may be realized, for example, by a pendulum support mount known from the prior art. In particular, this assembly serves for laterally supporting the assembly of the third attachment region, the first elastic mount and the first attachment region; thus, it is provided for providing support against the third attachment region tilting relative to the first attachment region from the first direction.

In particular, the second elastic mount is capable of elastically absorbing vibrations or movements of the engine in the second direction and insulating, in particular, vibrations or movements of the engine in the second direction.

The first attachment region and the second attachment region are rigidly connected to each other via the connection member, so that the first attachment region cannot move relative to the second attachment region. Furthermore, the distance between the first attachment region and the second attachment region is fixed via the connection member. In particular, the connection member is chosen such that, when the first attachment region contacts the body, the second attachment region also contacts another location of the body. Thus, if the first attachment region is correctly positioned on the body, the second attachment region is also appropriately disposed on the body.

The connection member may be a member separate from the first attachment region and the second attachment region, wherein they are firmly connected to each other, for example by screwing together or welding, in order to produce the engine mount pendulum support device. Alternatively, the first attachment region, the second attachment region and the connection member are formed integrally with one another; for example, these components are produced in a single casting.

The engine mount pendulum support device is advantageous in that it is supported in the second direction. The support is particularly effective because the second attachment region is offset from the first attachment region. Thus, in particular compared to the device described in JP 2005 075 223 A, an improved support can be obtained, whereby the force acting on the first attachment surface can be reduced. Thus, local overloads acting on the body can be avoided. In particular, in the event of an abuse of the vehicle in which rotating masses store kinetic energy and release it abruptly (racing start), support against the deflection of the engine can be provided particularly well.

Furthermore, the engine mount pendulum support device has the advantage of a simple installation into the vehicle because the second attachment region is fixed relative to the first attachment region, whereby a quick installation can be realized.

Advantageously, the first attachment surface and the second attachment surface can include an angle unequal to 0°, in particular 90°.

Since the second attachment region is provided for absorbing forces in the second direction, which is perpendicular to the first direction, this absorption is particularly successful if the second attachment surface is disposed at an angle to the first attachment surface. Particularly if the second attachment surface is perpendicular to the first attachment surface, i.e. if the absorption of forces by the second attachment region is parallel to the second direction, the forces stemming from the engine are transmitted particularly well onto the body.

It is advantageous that the first elastic mount is disposed between the first attachment region and the third attachment region, and/or that the second elastic mount is disposed between the second attachment region and the third attachment region.

Thus, by means of the first elastic mount, the third attachment region is disposed in a movable manner relative to the first attachment region. This can be effected in a particularly simple manner if the first elastic mount is disposed between the first attachment region and the third attachment region, wherein, in particular, the first elastic mount is disposed in the first direction between the first attachment region and the third attachment region.

The third attachment region is disposed in a movable manner relative to the second attachment region. In order to be able to effect a particularly good force transmission from the third attachment region to the second attachment region, the second elastic mount is disposed between those regions. The second elastic mount may be disposed in the second direction or the third direction between the second attachment region and the third attachment region.

Advantageously, the first elastic mount may comprise an engine mount, in particular a hydromount, a rectangular engine mount or a rubber-metal engine mount, and/or the second elastic mount may comprise a pendulum support mount.

The first elastic mount and the second elastic mount may each be formed by one or more elastic mounts. It is preferred, however, that the first elastic mount is realized only by an engine mount, and the second elastic mount by a pendulum support mount. The configuration of the engine mount and the pendulum support mount may be as is known from the prior art.

It is advantageous that the pendulum support mount comprises a first pendulum support bushing, which is fastened to the second attachment region, a second pendulum support bushing, which is fastened to the third attachment region, and a pendulum support, which connects the first pendulum support bushing to the second pendulum support bushing.

The pendulum support, in particular at both ends, has a fork grasping around the first pendulum support bushing and the second pendulum support bushing. Rods, which are each connected to the first pendulum support bushing and the second pendulum support bushing via an elastic material, are provided between the ends of the fork of the pendulum support. In this way, the force transmission may take place from the third attachment region to the second attachment region. The rod may be integrated by vulcanization into the elastomeric material of the first pendulum bushing and the second pendulum bushing, so that the pendulum support can be attached to the respective rod.

Alternatively, the first and second pendulum support bushings may be attached to the pendulum support. In that case, the forks to which the rod is attached are preferably attached to the third and second attachment regions.

Preferably, the second attachment region may be provided directly on the first pendulum support bushing, in particular on a side surface of the first pendulum support bushing.

For example, a side surface of the first pendulum support bushing forms the second attachment surface. Alternatively, one or more flanges forming the second attachment region may be provided directly on the first pendulum support bushing. The direct arrangement of the second attachment region on the first pendulum support bushing constitutes a particularly simple realization of the engine mount pendulum support device.

Alternatively, the second attachment region may be spaced apart from the first pendulum support bushing. The connection between the first pendulum support bushing and the second attachment region may be realized, for instance, by a bridging member. It is possible, for example, that the second attachment region, the bridging member and the first pendulum support bushing are formed integrally; for example, these components may be produced in a single casting.

It is advantageous that the second pendulum support bushing is provided on a cantilever of the third attachment region, wherein the second pendulum support bushing, by means of the cantilever, is preferably offset from the first elastic mount in a third direction perpendicular to the first direction and the second direction.

Providing a cantilever for attaching the second pendulum support bushing thereto allows for producing an optimum absorption of forces of the force acting in the second direction from the third attachment region to the second attachment region. This is advantageous, for example, if the second attachment region and the third attachment region are disposed along the third direction and the cantilever arranges the second pendulum support bushing in the second direction relative to the second attachment region. In particular, the pendulum support is arranged such, by means of the cantilever, that the former extends in the second direction. Thus, an improved force transmission from the third attachment region to the second attachment region can be made possible.

Advantageously, the second pendulum support bushing may be offset in the first direction from the first elastic mount, in particular disposed above it.

In particular, the center of the second pendulum support bushing matches an axial center line of the first elastic mount. In this configuration, a tilting movement of the first elastic mount from the first direction may be absorbed particularly well by the pendulum support, because the second elastic mount is disposed far from a tilting point of the second mount. The leverage of the second elastic mount is particularly large in this configuration. Furthermore, this configuration offers the advantage of being particularly space-saving in the second and third directions.

It is advantageous that an axial direction of the first pendulum support bushing and/or of the second pendulum support bushing matches the first direction.

The axial direction of the first and/or second pendulum support bushings corresponds, in particular, to the rod for attachment to the pendulum support. In particular, the axial direction is perpendicular to a radial direction of the first and/or second pendulum support bushings. This configuration makes it possible that a deflection of the third attachment region from the first direction can be absorbed particularly well by the second elastic mount, because the arrangement of the rod in the first and/or second pendulum support bushings extends in the axial direction, so that an elastic absorption in its radial direction is provided.

Advantageously, the first attachment region and/or the second attachment region and/or the third attachment region and/or the connection member may be fabricated from steel, aluminum, magnesium or plastic.

Furthermore, the invention relates to a motor vehicle having a body and an engine, wherein the engine is attached to the body via the above-described engine mount pendulum support device.

BRIEF DESCRIPTION OF THE DRAWINGS

Preferred embodiments of the invention are illustrated schematically in the attached drawings. In the drawings.

DETAILED DESCRIPTION

Figure 1:
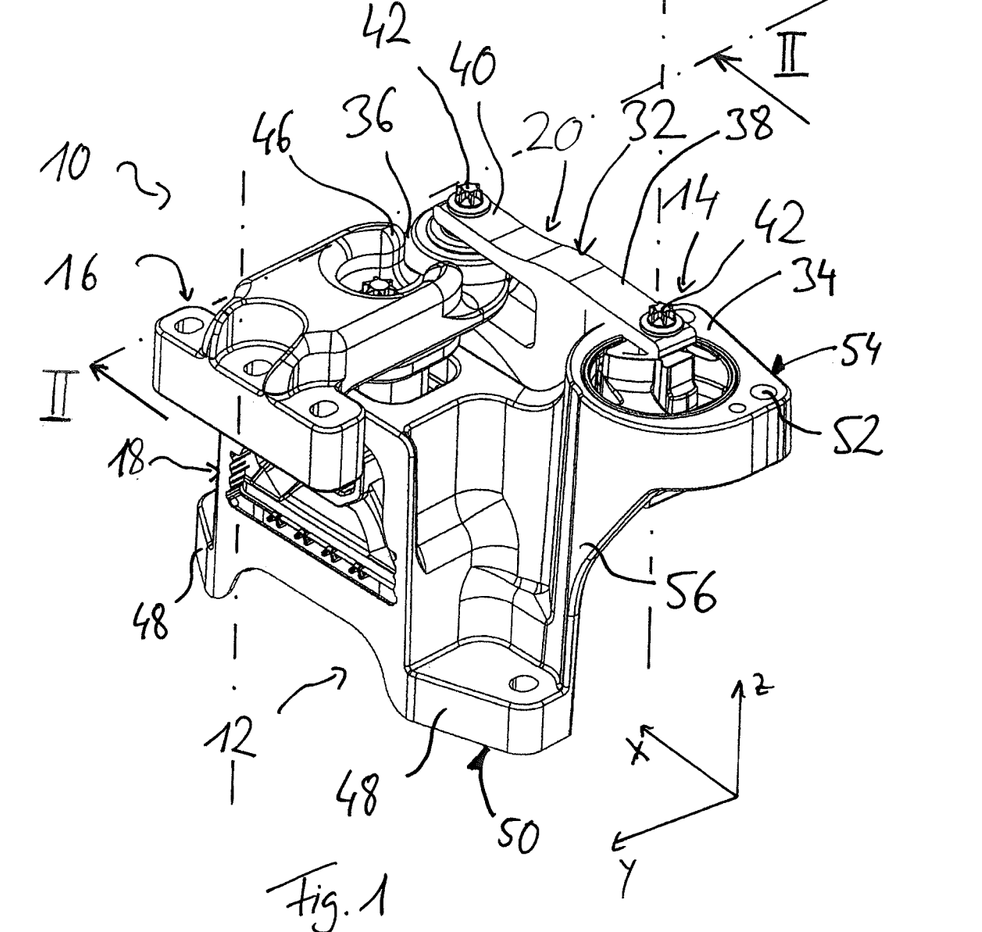
FIG. 1 shows a perspective view of an engine mount pendulum support device according to a first embodiment.
Figure 2:
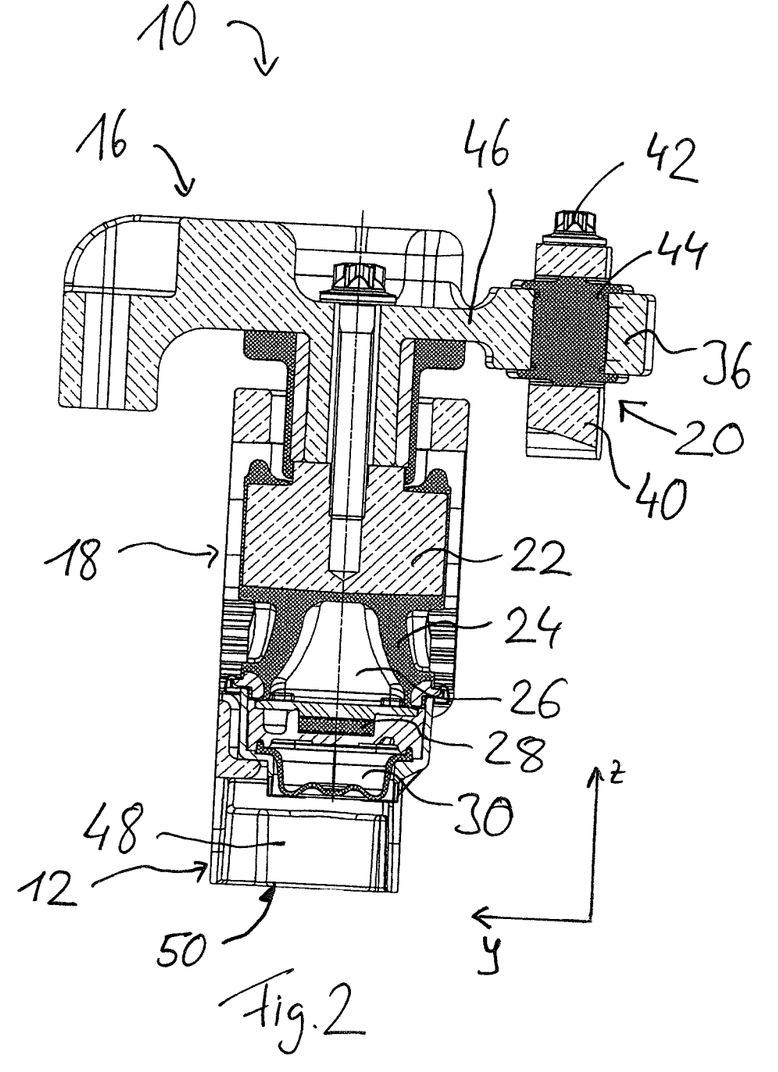
FIG. 2 shows a cross-sectional view of the engine mount pendulum support device according to FIG. 1 along plane I.

An engine mount pendulum support device 10 according to a first embodiment, as it is shown in FIGS. 1 and 2, comprises a first attachment region 12, a second attachment region 14, a third attachment region 16, a first elastic mount 18 and a second elastic mount 20.

The first elastic mount 18 is configured as a hydro box mount (Hydrokastenlager) and damps vibrations of an engine not shown in a first direction Z. The first elastic mount 18 is disposed between the first attachment region 12 and the third attachment region 16, so that the weight of the engine is transmitted onto the third attachment region 16, and thence via the first elastic mount 18 on the first attachment region 12 onto a side member, which is not shown in the Figures, of a body of a vehicle. The first mount 18 in the form of a hydro box mount comprises, in a known manner, a hydromount core 22, rubber walls 24 defining a working chamber 26 via a nozzle-diaphragm system 28. An equalization chamber 30 is separated from the working chamber 26 via the nozzle-diaphragm system 28.

The second elastic mount 20 is a pendulum support mount 32 comprising a first pendulum support bushing 34, a second pendulum support bushing 36 and a pendulum support 38. The first pendulum support bushing 34 is formed integrally with the second attachment region 14. The second pendulum support bushing 36 is formed integrally with the third attachment region 16. At both ends, the pendulum support 38 has a fork 40 detachably connected to a rod 42. The rod 42 is integrated by vulcanization 44 into the first pendulum support bushing 34 and the second pendulum support bushing 36. Thus, the rods 42 are arranged elastically relative to the first pendulum support bushing 34 and the second pendulum support bushing 36. The rods 42 extend along the first direction Z.

The second pendulum support bushing 36 is connected to the third attachment region 16 on one end of a cantilever 46. The second pendulum support bushing 36, the cantilever 46 and the third attachment region 16 are formed integrally with each other. The cantilever 46 extends in the third direction Y.

The first attachment region 12 has two flanges 48 by means of which the engine mount pendulum support device 10 can be attached to the body by means of screws. The flanges 48 are spaced apart in the second direction X and define a first attachment surface 50. The first attachment surface 50 extends in the plane spanned by the second direction X and the third direction Y. The first attachment surface 50 is planar.

The second attachment region 14 has two openings 54 by means of which the second attachment region 14 can be attached to another location of the body. The second attachment region 14 defines a second attachment surface 54 extending in a plane spanned by the first direction Z and the second direction X. The first attachment surface 50 and the second attachment surface 54 include an angle of 90°. Furthermore, the second attachment surface 54 is offset from the first attachment surface 50 in the first direction Z, in the second direction X and in the third direction Y.

The second attachment region 14 and the first attachment region 12 are rigidly connected to each other by a connection member 56. In the embodiment shown, the first attachment region 12, the second attachment region 14 and the connection member 56 are produced integrally as a cast part.

The third attachment region 16 is configured as a supporting arm for attachment to an engine, as this is known from the prior art.

The first attachment region 12, the second attachment region 14, the third attachment region 16 and the connection member 56 are fabricated from steel, aluminum, magnesium or plastic.

The mode of operation of the engine mount pendulum support device 10 according to FIGS. 1 and 2 will be described below. The engine of the vehicle is mounted on the third attachment region 16. Thus, the engine 16 is attached to the side member of the body via the first elastic mount 18 and the first attachment region 12. Vibrations of the engine in the first direction Z are absorbed by the first elastic mount 18, whereby the side member is decoupled from the engine.

Movements of the engine in the second direction X causing the third attachment region to tilt from the first direction Z are transmitted onto the second attachment region 14 by the second elastic mount 20. Thus, the third attachment region 16 is laterally supported by the second attachment region 14, so that support can be provided against forces in the second direction X and in the third direction Y by the second attachment region 14. Thus, the forces in the second direction X and in the third direction Y act less strongly on the first attachment region 12.

The second pendulum support bushing 36 is positioned in such a way by the cantilever 46 that the pendulum support 38 extends in the second direction X, so that the second elastic mount 20 is able to absorb movements of the engine in the second direction X particularly well.

Figure 3:
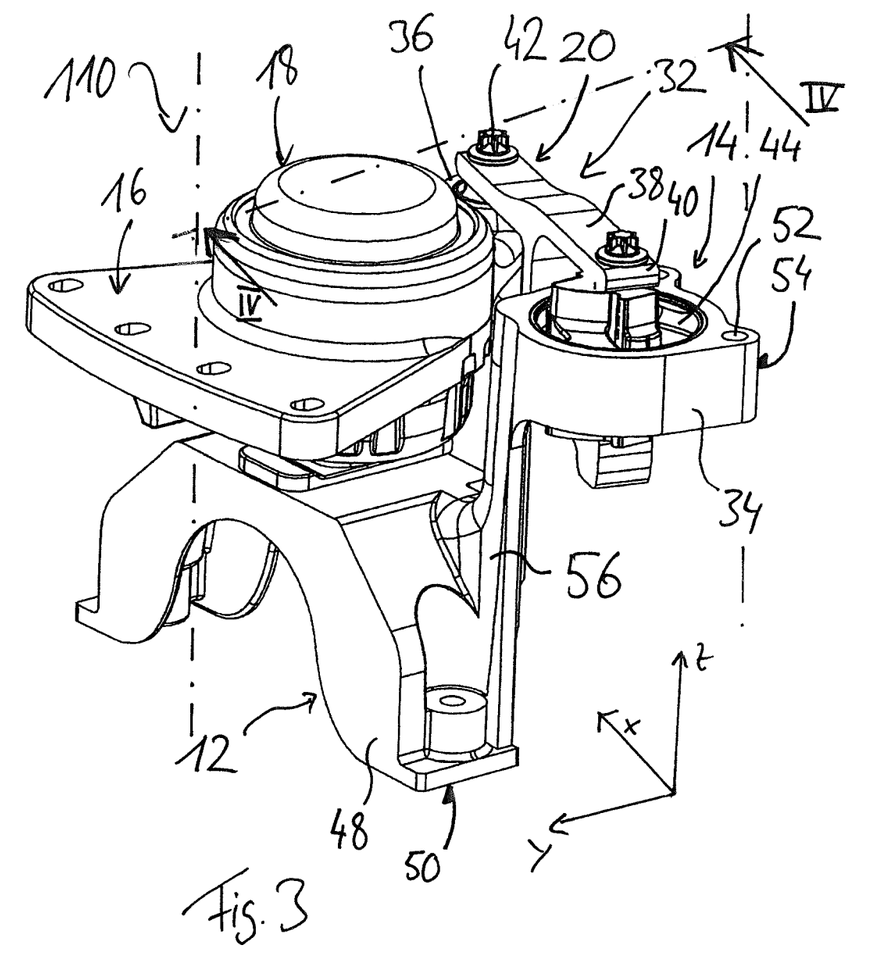
FIG. 3 shows a perspective view of an engine mount pendulum support device according to a second embodiment.
Figure 4:
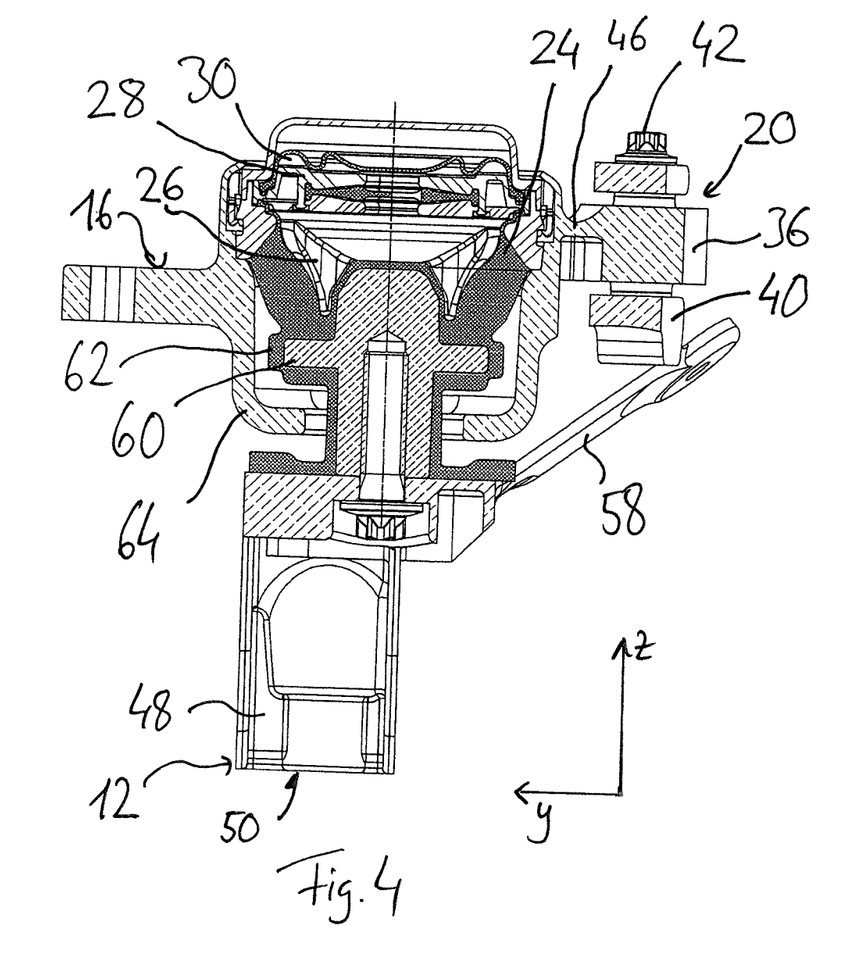
FIG. 4 shows a cross-sectional view through the engine mount pendulum support device according to FIG. 3 along plane I.

A second embodiment of the engine mount pendulum support device 110 according to FIGS. 3 and 4 is described below. Features and components matching the engine mount pendulum support device 10 according to the first embodiment of FIGS. 1 and 2 are provided with the same reference symbols. Thus, only differences between the engine mount pendulum support device 10 and the engine mount pendulum support device 110 are described below.

In this embodiment, the first elastic mount 18 is configured as a round hydromount. Furthermore, the first attachment region 12 and the third attachment region 16 have a different shape. In addition to the lateral support by the second attachment region 14, a side-support means 58 is provided in order to additionally support the engine mount pendulum support mount 110 in the third direction.

In particular, the sectional view of FIG. 4 is a section transverse to the traveling direction, wherein the first elastic mount 18 has a laterally flexible spring whose mount core 60 is connected to the side member of the body of the vehicle via the first attachment region 12. A cantilever 46 stabilizes the first attachment region 12 against lateral tilting by means of the support member 40 with a wheelhouse of the vehicle.

The first elastic mount 18 includes the mount core 60 provided with rubber stop regions 62 for limiting movement in all directions in space. Pulling and transverse movements along the second direction X and the third direction Y are supported against a mount housing 64, which is configured as a part of the third attachment region 16. High pressure loads act from the mount housing 64 on the first attachment region 12 via profiled rubber geometries.

Large drive torques act, on the one hand, from the mount core 60 on the mount housing 64 and, adapted thereto, via the pendulum support mount 32 on the second attachment region 14 screw-connected to the body. The transmission of forces is thus distributed onto the first attachment region 12 and the second attachment region 14 and, via the pendulum support mount 32, onto the body. Thus, local overloads acting on the body can be avoided.

A third embodiment of an engine mount pendulum support device 210 is described with reference to FIGS. 5 and 6. Components and features matching the engine mount pendulum support device 10 according to the first embodiment of FIGS. 1 and 2 are provided with the same reference symbols. Therefore, only the differences between the engine mount pendulum support device 210 according to FIGS. 5 and 6 and the engine mount pendulum support device 10 according to FIGS. 1 and 2 are described below.

As in the embodiment of the engine mount pendulum support device 110 of FIGS. 3 and 4, the first elastic mount 18 is configured as a hydromount.

The second elastic mount 20 is disposed above the first elastic mount 18 in a first direction Z, and not, as in the engine mount pendulum support device 10 according to FIGS. 1 and 2, offset from the first elastic mount 18 in a third direction Y. The second elastic mount 20 has a pendulum support mount 232 comprising a pendulum support 238. The pendulum support 238 includes the first pendulum support bushing 234 and the second pendulum support bushing 236. The rods 42 are each integrated by vulcanization into the elastomer bodies 44 of the first pendulum support bushing 234 and the second pendulum support bushing 236. In contrast to the attachment region shown hitherto, the forks 240 are not provided on the pendulum support 238, but on the second attachment region 14 and on the third attachment region 16. The forks 240 are each formed integrally with the second attachment region 14 and the third attachment region 16.

In contrast to the embodiments shown above of the engine mount pendulum support device 10, 110, the second attachment region 14 is not provided directly on the first pendulum support bushing 34, but has a bridging member 260 located therebetween. The bridging member 260, the fork 240, the connection member 56, the second attachment region 14 and the first attachment region 12 are formed integrally.

Figure 5:
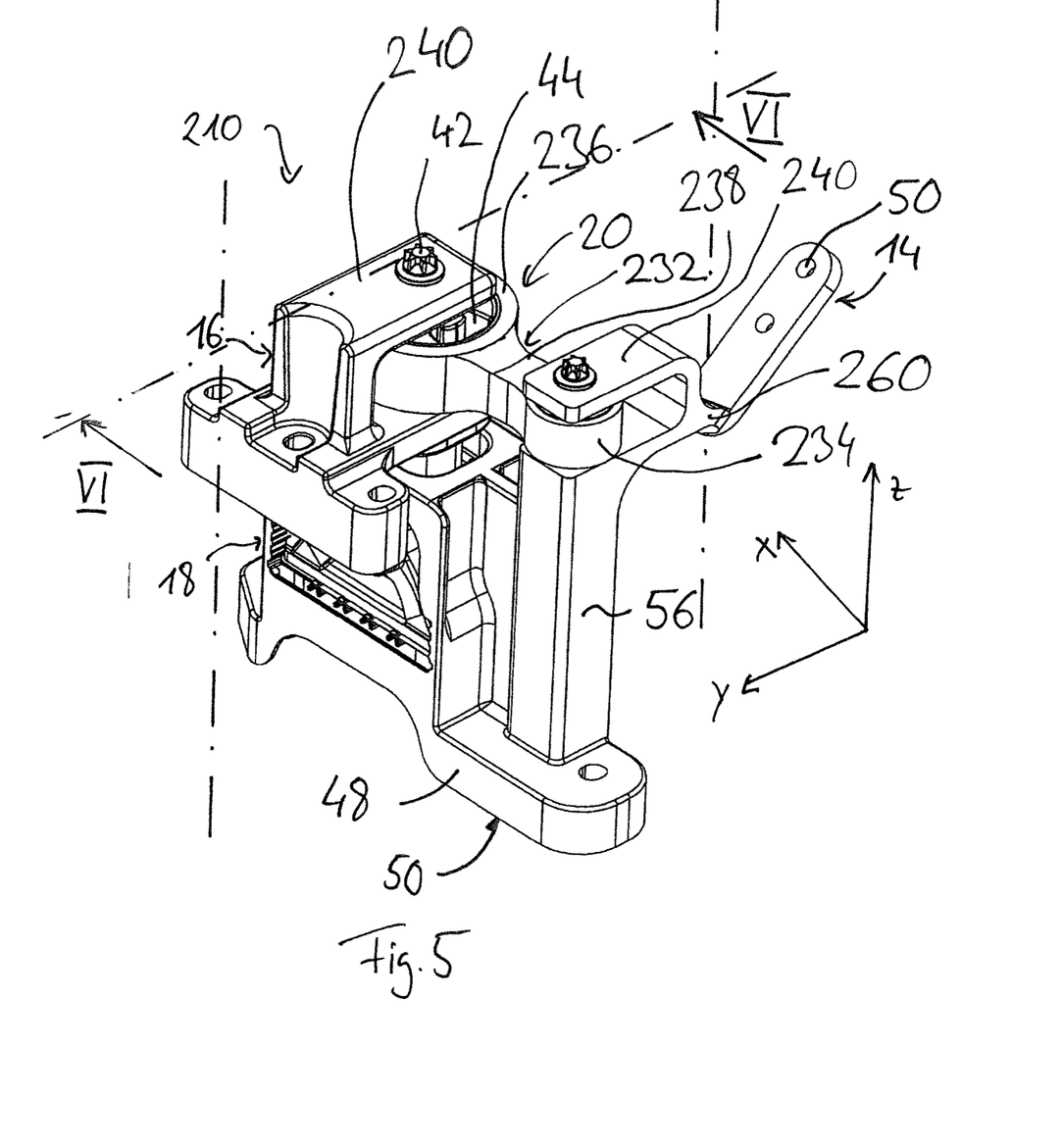
FIG. 5 shows a perspective view of an engine mount pendulum support device according to a third embodiment.
Figure 6:
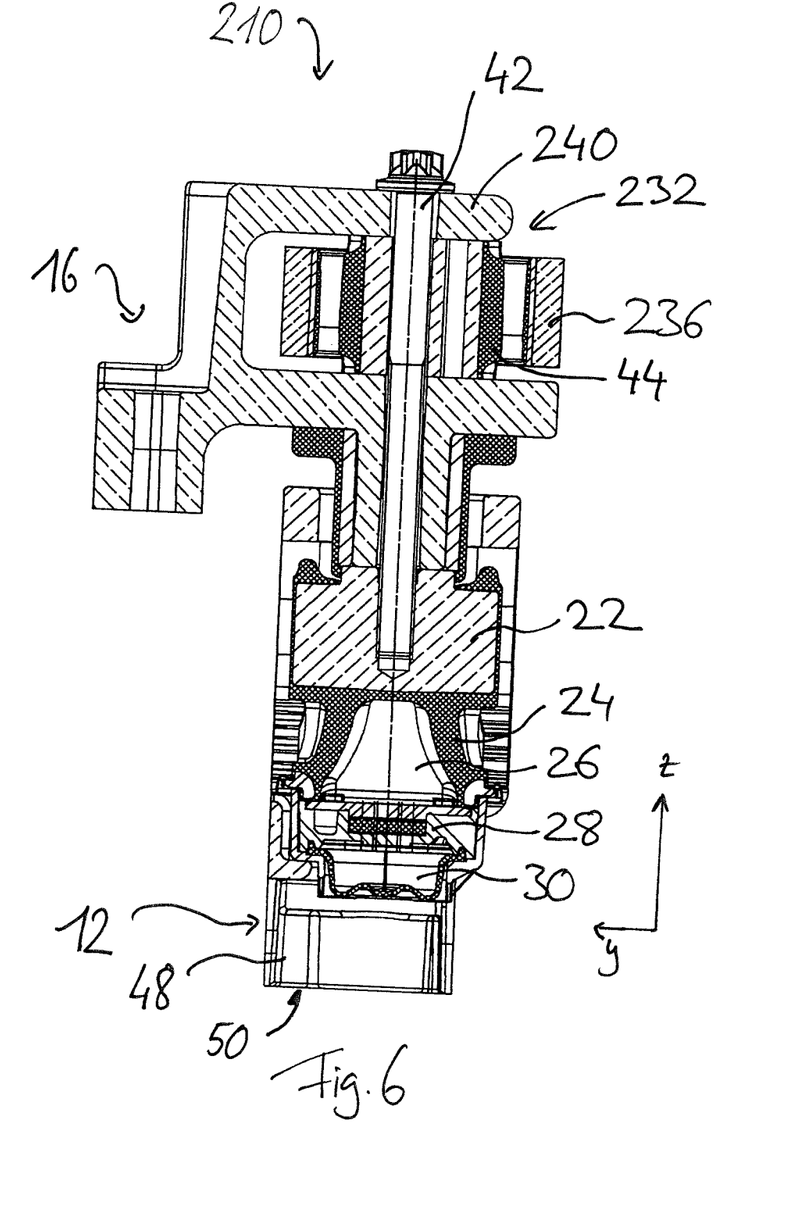
FIG. 6 shows a cross-sectional view of the engine mount pendulum support device according to FIG. 5 along plane I.

The embodiment of the engine mount pendulum support device 210 shown in FIGS. 5 and 6 is particularly capable of effecting the tilting of the third attachment region 16 from the first direction Z, because the second elastic mount 20, in particular the second pendulum support bushing 236, is spaced far from a pivot point of the first elastic mount 18 in the first direction Z. Thus, the lever in the engine mount pendulum support device 10 for laterally supporting the third attachment region 16 is improved as compared to the engine mount pendulum support devices 10, 110. At the same time, the engine mount pendulum support device 210 is particularly thin with respect to its extent in the third direction Y.

Figure 7:
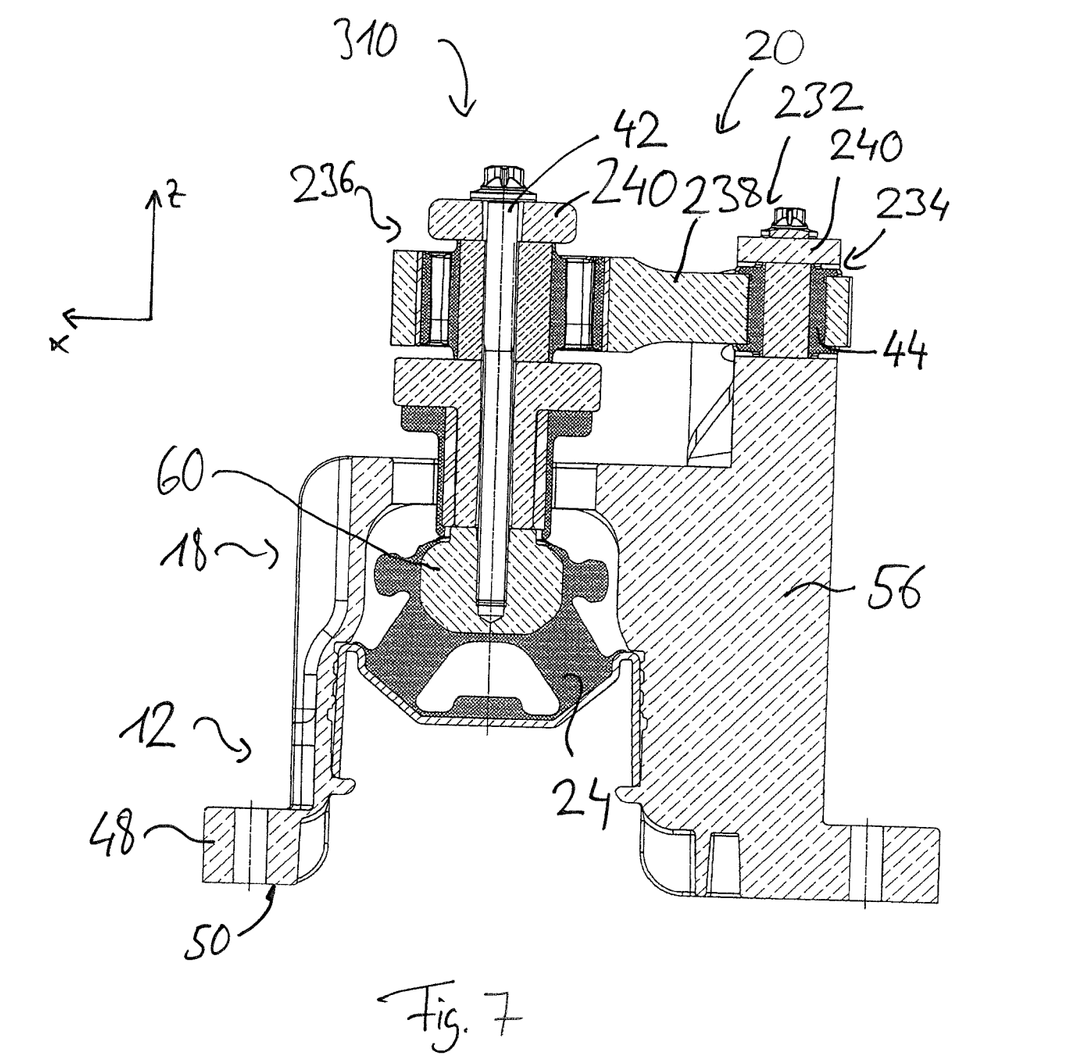
FIG. 7 shows a cross-sectional view of an engine mount pendulum support device according to a fourth embodiment.
Figure 8:
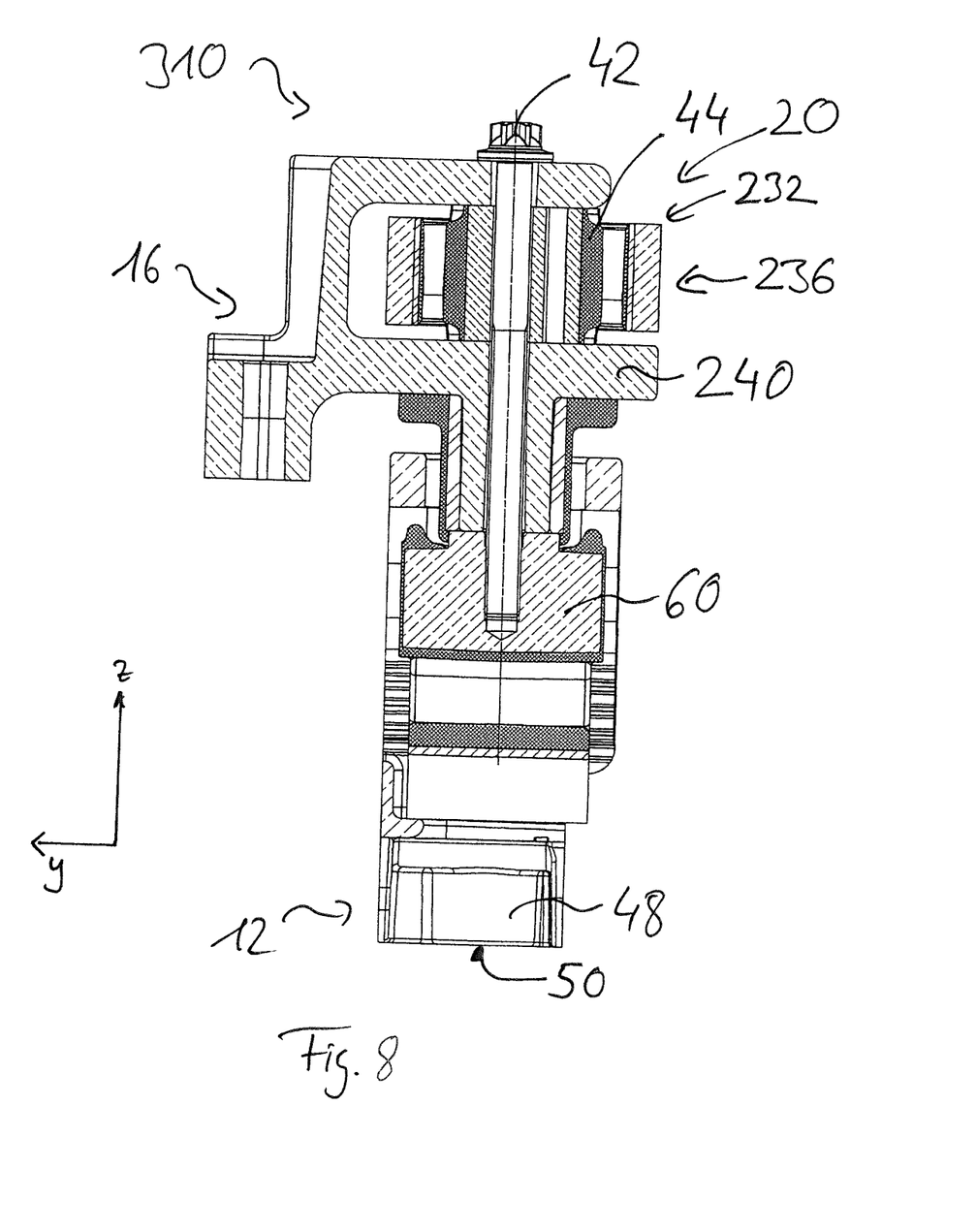
FIG. 8 shows a cross-sectional view of the engine mount pendulum support device according to FIG. 7, which is perpendicular to the view of FIG. 7.

Another embodiment of an engine mount pendulum support device 310 is described with reference to FIGS. 7 and 8. It matches the engine mount pendulum support device 210 of FIGS. 5 and 6. The engine mount pendulum support device 310 differs from the engine mount pendulum support device 210 in that the first mount 18 in the embodiment shown in FIGS. 7 and 8 is provided by a rubber-metal engine mount and not, as shown in FIGS. 6 and 7, by a hydromount. Otherwise, the engine mount pendulum support device 310 matches the engine mount pendulum support device 210.

LIST OF REFERENCE NUMERALS

10 Engine mount pendulum support device
12 First attachment region
14 Second attachment region
16 Third attachment region
18 First elastic mount
20 Second elastic mount
22 Hydromount core
24 Rubber wall
26 Working chamber
28 Nozzle-diaphragm system
30 Equalization chamber
32 Pendulum support mount
34 First pendulum support bushing
36 Second pendulum support bushing
38 Pendulum support
40 Fork
42 Rod
44 Elastomer body
46 Cantilever
48 Flange
50 First attachment surface
52 Opening
54 Second attachment surface
56 Connection member
58 Side-support means
60 Mount core
62 Stop region
64 Mount housing
110 Engine mount pendulum support device
210 Engine mount pendulum support device
232 Pendulum support mount
234 First pendulum support bushing
236 Second pendulum support bushing
238 Pendulum support
240 Fork
260 Bridging member
310 Engine mount pendulum support device
X Second direction
Y Third direction
Z First direction

The invention claimed is:

1. An engine mount pendulum support device for supporting an engine relative to a body of a motor vehicle, comprising:
a first attachment region for attaching the engine mount pendulum support device to the body, including a first attachment surface for contact with the body,
a second attachment region for attaching the engine mount pendulum support device to the body, including a second attachment surface for contact with the body,
a third attachment region for attaching the engine to the engine mount pendulum support device,
wherein the second attachment surface is offset from a plane defined by the first attachment surface; the first attachment region and the second attachment region are elastically connected to the third attachment region via a first elastic mount, which is configured for absorbing vibrations in a first direction, and via a second elastic mount, which is configured for absorbing vibrations in a second direction perpendicular to the first direction; and the first attachment region and the second attachment region are firmly connected to each other by a connection member; wherein the first elastic mount is disposed between the first attachment region and the third attachment region, and the second elastic mount is disposed between the second attachment region and the third attachment region.

2. The engine mount pendulum support device according to claim 1, wherein the first and the second attachment surfaces include an angle unequal to 0°.

3. The engine mount pendulum support device according to claim 1, wherein the first elastic mount comprises a hydromount, a rectangular engine mount, or a rubber-metal engine mount.

4. The engine mount pendulum support device according to claim 3, wherein, the second elastic mount comprises a pendulum support mount.

5. The engine mount pendulum support device according to claim 1, wherein, the second elastic mount comprises a pendulum support mount.

6. The engine mount pendulum support device according to claim 5, wherein the pendulum support mount comprises a first pendulum support bushing, which is fastened to the second attachment region; a second pendulum support bushing, which is fastened to the third attachment region; and a pendulum support, which connects the first pendulum support bushing to the second pendulum support bushing.

7. The engine mount pendulum support device according to claim 6, wherein the second attachment region is provided directly on the first pendulum support bushing on a side surface of the first pendulum support bushing.

8. The engine mount pendulum support device according to claim 6, wherein the second pendulum support bushing is provided on a cantilever of the third attachment region, and the second pendulum support bushing, by means of the cantilever, is offset from the first elastic mount in a third direction perpendicular to the first direction and the second direction.

9. The engine mount pendulum support device according to claim 6, wherein the second pendulum support bushing is offset in the first direction from the first elastic mount, and disposed above the first elastic mount.

10. The engine mount pendulum support device according to claim 6, wherein an axial direction of the first pendulum support bushing and/or of the second pendulum support bushing matches the first direction.

11. The engine mount pendulum support device according to claim 1, wherein one or more of the first attachment region, the second attachment region, the third attachment region, and the connection member is fabricated from steel.

12. The engine mount pendulum support device according to claim 1, wherein one or more of the first attachment region, the second attachment region, the third attachment region, and the connection member is fabricated from aluminum.

13. The engine mount pendulum support device according to claim 1, wherein one or more of the first attachment region, the second attachment region, the third attachment region, and the connection member is fabricated from magnesium.

14. The engine mount pendulum support device according to claim 1, wherein one or more of the first attachment region, the second attachment region, the third attachment region, and the connection member is fabricated from plastic.

15. An engine mount pendulum support device for supporting an engine relative to a body of a motor vehicle, comprising:
a first attachment region for attaching the engine mount pendulum support device to the body, including a first attachment surface for contact with the body,
a second attachment region for attaching the engine mount pendulum support device to the body, including a second attachment surface for contact with the body,
a third attachment region for attaching the engine to the engine mount pendulum support device,
wherein the second attachment surface is offset from a plane defined by the first attachment surface; the first attachment region and the second attachment region are elastically connected to the third attachment region via a first elastic mount, which is configured for absorbing vibrations in a first direction, and via a second elastic mount, which is configured for absorbing vibrations in a second direction perpendicular to the first direction; and the first attachment region and the second attachment region are firmly connected to each other by a connection member;
wherein, the second elastic mount comprises a pendulum support mount; and wherein the pendulum support mount comprises a first pendulum support bushing, which is fastened to the second attachment region; a second pendulum support bushing, which is fastened to the third attachment region; and a pendulum support, which connects the first pendulum support bushing to the second pendulum support bushing.

* * * * *